United States Patent
Zhang et al.

(10) Patent No.: US 10,909,282 B2
(45) Date of Patent: Feb. 2, 2021

(54) METHOD FOR RIGIDITY ENHANCEMENT AND WEIGHT REDUCTION USING LASER PEENING

(71) Applicant: GUANGDONG UNIVERSITY OF TECHNOLOGY, Guangzhou (CN)

(72) Inventors: Yongkang Zhang, Guangzhou (CN); Zheng Zhang, Guangzhou (CN)

(*) Notice: Subject to any disclaimer, the term of this patent is extended or adjusted under 35 U.S.C. 154(b) by 364 days.

(21) Appl. No.: 16/153,717

(22) Filed: Oct. 6, 2018

(65) Prior Publication Data
US 2019/0042680 A1 Feb. 7, 2019

Related U.S. Application Data

(63) Continuation of application No. PCT/CN2017/094099, filed on Jul. 24, 2017.

(30) Foreign Application Priority Data

Apr. 25, 2017 (CN) .......................... 2017 1 0285284

(51) Int. Cl.
| | | |
|---|---|---|
| *G06F 30/23* | (2020.01) | |
| *G06F 30/15* | (2020.01) | |
| *G06F 111/04* | (2020.01) | |
| *G06F 111/06* | (2020.01) | |
| *G06F 111/10* | (2020.01) | |
| *G06F 111/20* | (2020.01) | |

(52) U.S. Cl.
CPC .............. *G06F 30/23* (2020.01); *G06F 30/15* (2020.01); *G06F 2111/04* (2020.01); *G06F 2111/06* (2020.01); *G06F 2111/10* (2020.01); *G06F 2111/20* (2020.01)

(58) Field of Classification Search
None
See application file for complete search history.

(56) References Cited

U.S. PATENT DOCUMENTS

| | | | | |
|---|---|---|---|---|
| 6,203,633 B1 * | 3/2001 | Clauer | ..................... | C21D 1/00 148/565 |
| 2004/0262276 A1 * | 12/2004 | Davis | ................. | G01N 29/2418 219/121.85 |
| 2007/0068605 A1 | 3/2007 | Statnikov | | |

FOREIGN PATENT DOCUMENTS

CN  105528503 A  4/2016

* cited by examiner

*Primary Examiner* — Craig C Dorais
(74) *Attorney, Agent, or Firm* — Erson IP (Nelson IP)

(57) ABSTRACT

A method for rigidity enhancement and weight reduction using laser peening, includes the following steps: determining a limit size of a component; performing laser peening strengthening test on the component, and setting multiple groups of strengthening parameters; performing material performance test on the component, and acquiring material performance improvement data; determining a topological optimization strengthening region; optimizing the cross-sectional size of the component according to the material performance improvement data; and estimating static/dynamic strength, rigidity, bearing capacity and reliability indexes of the optimized component, judging whether design requirements are met or not, and repeating the step of determining the topological optimization strengthening region if NO, or completing the design of the component if YES.

8 Claims, 4 Drawing Sheets

METHOD FOR RIGIDITY ENHANCEMENT AND WEIGHT REDUCTION USING LASER PEENING

CROSS-REFERENCE TO RELATED APPLICATIONS

This application is a continuation of International Patent Application No. PCT/CN2017/094099 with a filing date of Jul. 24, 2017, designating the United States, now pending, and further claims priority to Chinese Patent Application No. 201710285284.7 with a filing date of Apr. 25, 2017. The content of the aforementioned applications, including any intervening amendments thereto, are incorporated herein by reference.

TECHNICAL FIELD

The present disclosure relates to the field of aerospace component design, and particularly to a method for rigidity enhancement and weight reduction using laser peening.

BACKGROUND OF THE PRESENT INVENTION

Optimum structural design is to find a best design solution according to a certain objective (such as a lightest weight, lowest cost and highest stiffness) under a specified constraint condition, and was known as best structural design or optimal structural design before. Relative to "structural analysis", the optimum structural design is also known as "structural synthesis". For example, if the objective is to make a structural weight minimum, the optimum structural design is known as minimum weight design.

In aerospace, aviation and automobile industries, the structural weight is related to key parameters such as a payload ratio and a fuel consumption rate. Lightweight design plays an important role in structural optimization. The optimum structural design has the characteristic that advanced algorithms such as a genetic algorithm, a neural network and parallel computing are adopted on the basis of a multidisciplinary integrated design concept of a numerical simulation technology to perform size optimization, shape optimization and topological optimization on a component.

At present, in the aerospace and aviation field, widely adopted structural lightweight designs mainly include: 1) a sandwich structure which comprises upper and lower thin and rigid panels and a light-weight core material which is packed between the two panels and is firmly connected with the panels, and has the feature of high bending rigidity and can increase the effective utilization rate of the materials and reduce the weight; 2) a grating structure, also known as a material grid structure, which is a polygonal mesh consisting of reinforcing ribs, and has the features of high autostability, high structural buckling resistance performance, high specific strength and specific rigidity, convenience in detection and repair and the like; 3) a dot-matrix structure which is a three-dimensional spatial-periodic structure consisting of nodes and rod units connected with the nodes and is similar to a truss system, and has the features of high autostability, high structural buckling resistance performance, high bearing capacity and high material utilization efficiency; and 4) a truss structure which is an axisymmetric truss structure formed by mutually interweaving longitudinal ribs parallel to a longitudinal central axis of a truss and spiral ribs uniformly disposed around the central axis, and has the features of high structural weight reduction, high integrality, high bearing capacity and the like.

However, the current structural lightweight design mainly focuses on the theoretical directions of algorithms such as the topological optimization and the size optimization of spatial structures of components, so that there is no information feedback in a design stage and a manufacturing stage, and the potential for the lightweight design of the components has not been completely developed yet.

Therefore, how to realize the lightweight design of the component at the same time of guaranteeing the performance of the component is a technical problem required to be solved by those skilled in the art at present.

SUMMARY OF PRESENT INVENTION

The present disclosure aims at providing a method for rigidity enhancement and weight reduction using laser peening. An overall aerospace component which has been designed to be light in weight may be further subjected to high-performance lightweight improvement by using laser peening strengthening and optimum structural design, so that the weight reduction efficiency is increased, and the payload is increased.

In order to achieve the above-mentioned objective, the present disclosure provides the following technical solutions:

A method for rigidity enhancement and weight reduction using laser peening includes: step S1: performing structural design on a component, and determining a limit size of the component; step S2: intercepting the component by adopting a material having the same trade mark and in an as-heat-treated state, performing laser peening strengthening test on the component, and setting multiple groups of strengthening parameters; step S3: performing material performance test on the component, and acquiring material performance improvement data; step S4: determining a topological optimization strengthening region, building a mathematical model, setting a target function and a constraint condition, and solving an area, the number and a layout form of a laser peening strengthening region by adopting a finite element; step S5: optimizing a cross-sectional size of the component according to the material performance improvement data; and step S6: estimating static/dynamic strength, rigidity, bearing capacity and reliability indexes of the optimized component, judging whether design requirements are met or not, and repeating the step S4 if NO, or completing the design of the component if YES.

Preferably, Step S1 includes: step S11: building a model of the component, and acquiring a geometric shape of the component; step S12: determining an external load and a boundary condition of the component; and step S13: performing structural stress and strain analysis according to the geometric shape, the external load and the boundary condition of the component, and determining the limit size of the component according to an analysis result.

Preferably, the step S11 specifically includes: building an aluminum alloy single-skin grating integral panel model by adopting CATIA software.

Preferably, the step S13 specifically includes: determining limit sizes of all portions of the component through theoretical analysis and numerical simulation, and performing structural instability analysis to determine a limit depth-to-width ratio of a grating structure.

Preferably, in the step S3, the material performance improvement data include tensile strength, a Young modulus and fatigue life prolonging data of the material.

Preferably, the step S4 further includes: designing laser peening strengthening treatment modes with different forms, and acquiring structural stress characteristics under different forms.

Preferably, the laser peening strengthening treatment modes include outer-skin full treatment, equispaced region treatment and nonequispaced region treatment for an aluminum alloy single-skin grating integral panel.

Preferably, the step S5 specifically includes: setting the target function and the constraint condition, wherein with the goal of minimum mass, the constraint condition is that variables of the structural strength and the rigidity are less than 0.01%, and the cross-sectional size of the component is optimized by adopting parallel computing and numerical simulation methods.

The method for rigidity enhancement and weight reduction using laser peening provided by the present disclosure includes the following steps: performing the structural design on the component, and determining the limit size of the component; intercepting the component by adopting the material having the same trade mark and in the as-heat-treated state, performing the laser peening strengthening test on the component, and setting the multiple groups of strengthening parameters; performing the material performance test on the component, and acquiring the material performance improvement data; determining the topological optimization strengthening region, building the mathematical model, setting the target function and the constraint condition, and solving the area, the number and the layout form of the laser peening strengthening region by adopting the finite element; optimizing the cross-sectional size of the component according to the material performance improvement data; and estimating the static/dynamic strength, rigidity, bearing capacity and reliability indexes of the optimized component, judging whether design requirements are met or not, and repeating the step of determining the topological optimization strengthening region if NO, or completing the design of the component if YES. The method for rigidity enhancement and weight reduction using laser peening may improve parameters such as the strength, the rigidity and the fatigue life of the material by using a laser peening strengthening technology, belongs to cold machining, and is free of thermal effect damage and high in component treatment reliability. Meanwhile, the overall aerospace component which has been designed to be light in weight may be further subjected to the high-performance lightweight improvement by using the laser peening strengthening and the optimum structural design, so that the weight reduction efficiency is increased, and the payload is increased. Meanwhile, when the component is treated through the laser peening strengthening, the fatigue life of the component may be prolonged, so that the method is not only applicable to a single-tasking overall aerospace component, but also applicable to treatment of a long-service aerospace component and an automotive lightweight component.

DESCRIPTION OF THE DRAWINGS

In order to make the technical solutions in the disclosure or in the prior art described more clearly, the drawings associated to the description of the embodiments or the prior art will be illustrated concisely hereinafter. Obviously, the drawings described below are only some embodiments according to the disclosure. Numerous drawings therein will be apparent to one of ordinary skill in the art based on the drawings described in the disclosure without creative efforts.

In drawings: 1: outer skin; 2: grating portion; 3: laser peening strengthening layer; and 4: original material layer.

DETAILED DESCRIPTION OF PREFERRED EMBODIMENTS

The main idea of the present disclosure is to provide a method for rigidity enhancement and weight reduction using laser peening used for improving the performance of a component and realizing weight reduction of the component, thereby improving the comprehensive performance of a spacecraft or an aircraft.

In order to make those skilled in the art understand the solution of the present disclosure better, the present disclosure is further described in detail below with reference to the drawings and specific embodiments.

Figure 1:
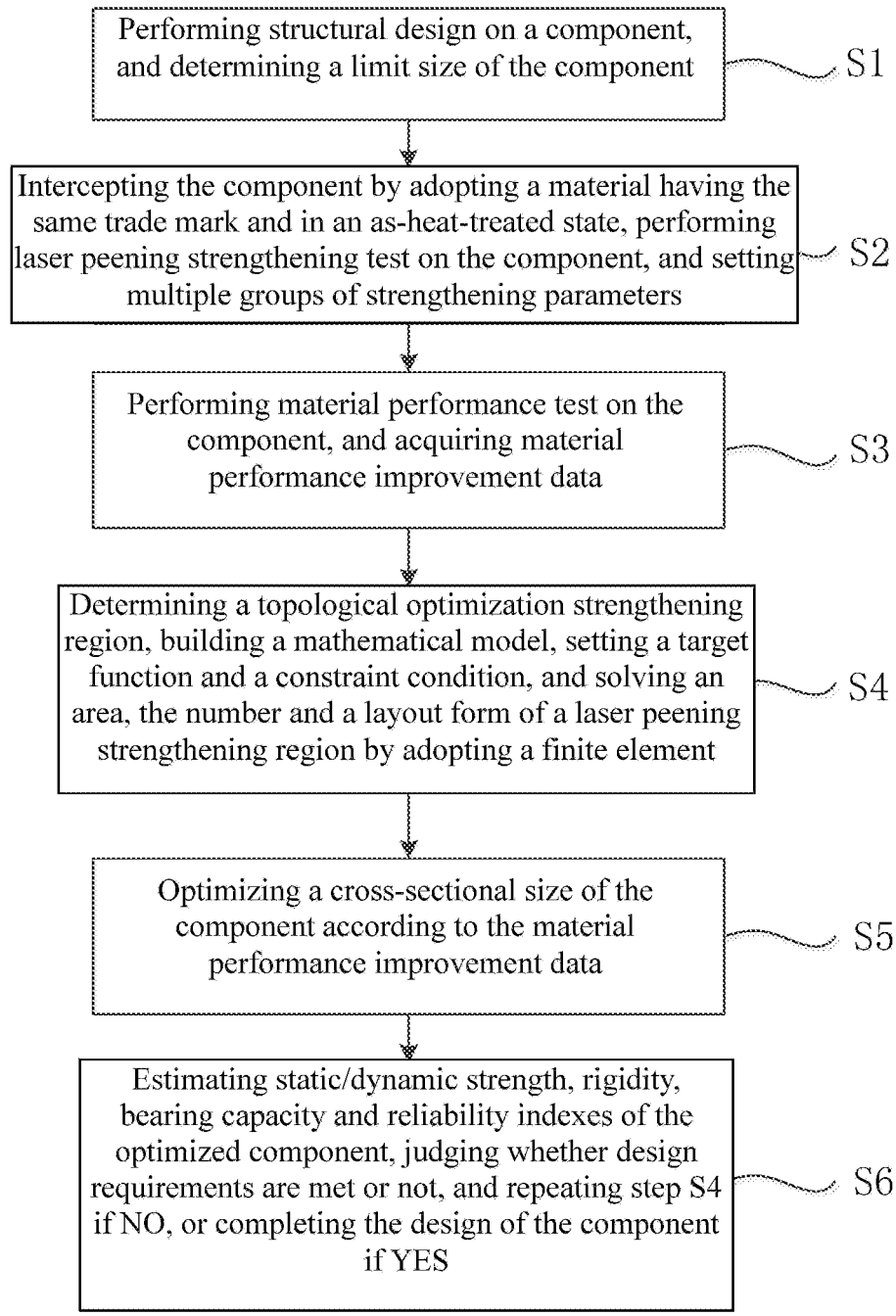
FIG. 1 is a flow chart of a method for rigidity enhancement and weight reduction using laser peening according to a specific embodiment of the present disclosure.
Figure 2:
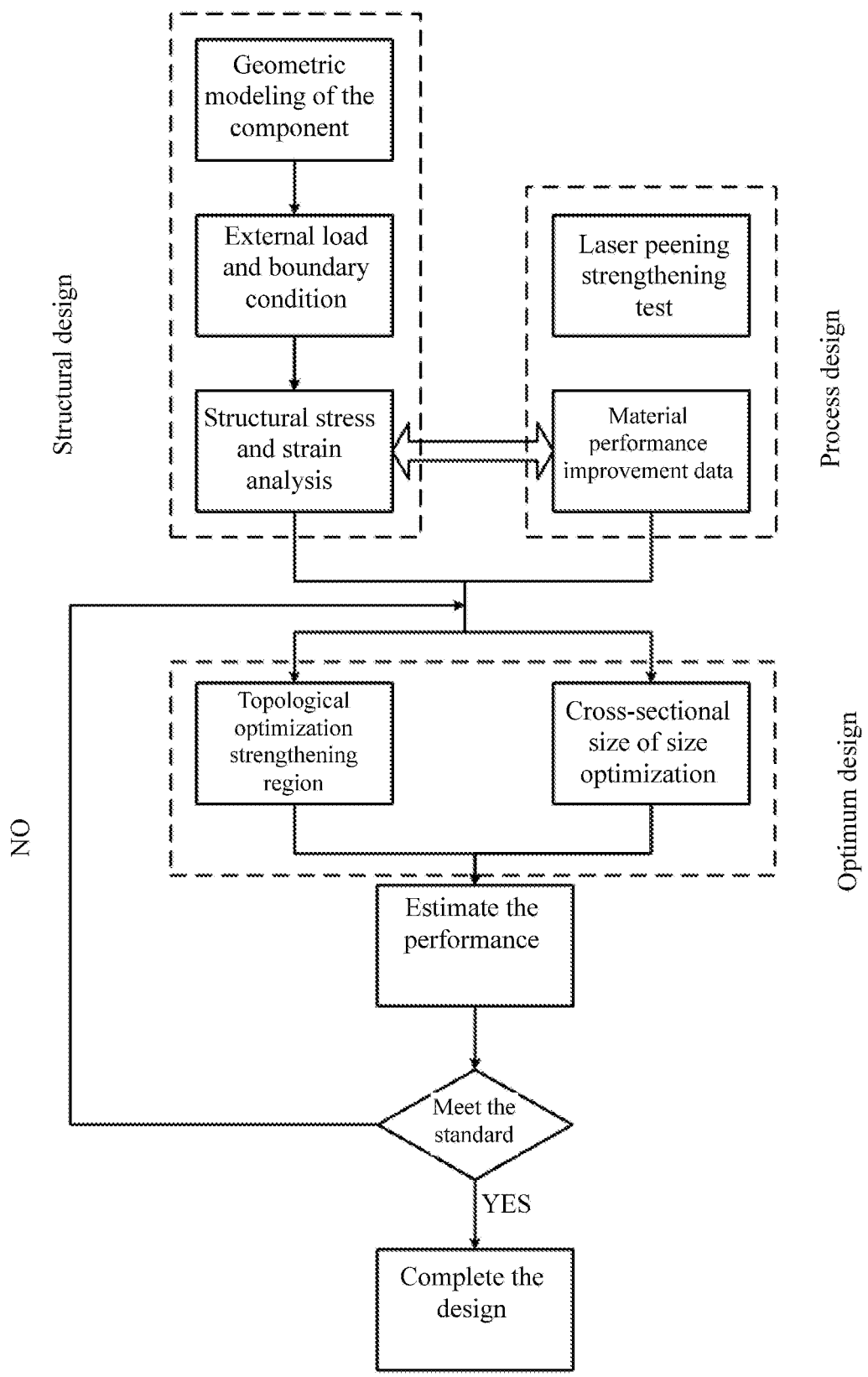
FIG. 2 is a schematic diagram of a method for rigidity enhancement and weight reduction using laser peening according to a specific embodiment of the present disclosure.
Figure 3:
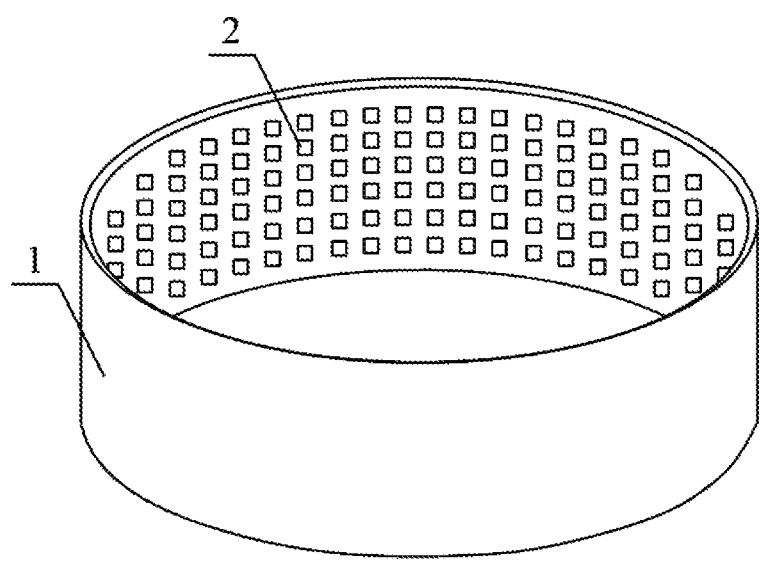
FIG. 3 is a structural schematic diagram of an aluminum alloy single-skin grating integral panel of a spacecraft provided by the present disclosure.
Figure 4:
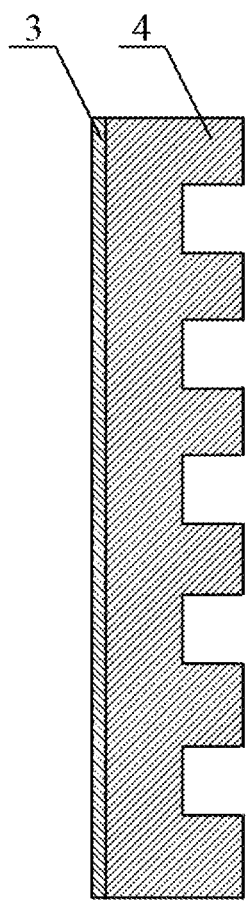
FIG. 4 is a cross-sectional view of the aluminum alloy single-skin grating integral panel of the spacecraft shown in FIG. 3.

Referring to FIGS. 1 to 4, FIG. 1 is a flow chart a method for rigidity enhancement and weight reduction using laser peening according to a specific embodiment of the present disclosure. FIG. 2 is a schematic diagram of a method for rigidity enhancement and weight reduction using laser peening according to a specific embodiment of present disclosure. FIG. 3 is a structural schematic diagram of an aluminum alloy single-skin grating integral panel of a spacecraft provided by the present disclosure. FIG. 4 is a cross-sectional view of the aluminum alloy single-skin grating integral panel of the spacecraft as shown in FIG. 3.

In the present embodiment, the method for rigidity enhancement and weight reduction using laser peening includes the following steps:

Step S1: performing structural design on a component, and determining a limit size of the component;

Step S2: intercepting the component by adopting a material having the same trade mark and in an as-heat-treated state, performing laser peening strengthening test on the component, and setting multiple groups of strengthening parameters;

Step S3: performing material performance test on the component, and acquiring material performance improvement data;

Step S4: determining a topological optimization strengthening region, building a mathematical model, setting a target function and a constraint condition, and solving an area, the number and a layout form of a laser peening strengthening region by adopting a finite element;

Step S5: optimizing a cross-sectional size of the component according to the material performance improvement data; and Step S6: estimating static/dynamic strength, rigidity, bearing capacity and reliability indexes of the optimized component, judging whether design requirements are met or not, and repeating step S4 if NO, or completing the design of the component if YES.

The method for rigidity enhancement and weight reduction using laser peening may improve parameters such as the strength, the rigidity and the fatigue life of the material by using a laser peening strengthening technology, belongs to cold machining, and is free of thermal effect damage and high in component treatment reliability. Meanwhile, an overall aerospace component which has been designed to be light in weight may be further subjected to high-performance lightweight improvement by using laser peening strengthening and optimum structural design, so that the weight reduction efficiency is increased, and the payload is increased. Meanwhile, when the component is treated by using the laser peening strengthening, the fatigue life of the component may be prolonged, so that the method is not only applicable to a single-tasking overall aerospace component, but also applicable to treatment of a long-service aerospace component and an automotive lightweight component. The method improves the strength, the rigidity and the fatigue life of the material mainly by using the laser peening strengthening, realizes regulation and control of the rigidity gradient of the component and reduction of the structural weight, and is applicable to weight reduction of the overall aerospace component.

Further, the step S1 of performing the structural design on the component and determining the limit size of the component specifically includes:

Step S11: building a model of the component, and acquiring a geometric shape of the component. More specifically, the building of the model of the component may be specifically building an aluminum alloy single-skin grating integral panel model by adopting CATIA software. As shown in FIG. 3, a grating structure 2 is located at the inner circumferential portion of an outer skin 1. Of course, the CATIA software is preferred software, but model building software in other forms is also allowable.

Step S12: Determining an external load and a boundary condition of the component. Specifically, a cylindrical integral panel mainly plays a role in maintaining the structural shape and the stability. An axial load is a main bearing mode. An inertia force is determined according to a designed moving attitude of the spacecraft. The boundary condition is to limit the displacement in an axial direction.

Step S13: Performing structural stress and strain analysis according to the geometric shape, the external load and the boundary condition of the component, and determining the limit size of the component according to an analysis result. Specifically, the step S13 may include: determining limit sizes of all portions of the component through theoretical analysis and numerical simulation, and performing structural instability analysis to determine a limit depth-to-width ratio of the grating structure.

Specifically, in the step S2 of intercepting the component by adopting the material having the same trade mark and in the as-heat-treated state, performing the laser peening strengthening test on the component, and setting multiple groups of strengthening parameters, the multiple groups of strengthening parameters are set as standbys. Finally, a parameter having the best strengthening effect in the multiple groups of strengthening parameters is selected to machine a product, so that the product machining accuracy is improved.

In the step S3 of performing the material performance test on the component, and acquiring the material performance improvement data, preferably, the material performance improvement data include data such as tensile strength, a Young modulus and fatigue life prolonging data of the material. After an aluminum alloy material is subjected to the laser peening strengthening treatment, the Young modulus, the tensile strength and the yield strength are averagely improved by 12%. A rigidity improvement rate, namely the material performance improvement data, may be calculated according to structurally geometric characteristics. As shown in FIG. 4, after the laser peening strengthening is performed, a laser peening strengthening layer 4 and an original material layer 3 are firmly combined.

The step S4 of determining the topological optimization strengthening region, building the mathematical model, setting the target function and the constraint condition, and solving the area, the number and the layout form of the laser peening strengthening region by adopting the finite element further specifically includes: designing laser peening strengthening treatment modes with different forms, and acquiring structural stress characteristics under different forms.

After the component is optimized through the step S4 and step S5, the step S6 is carried out: estimating the static/dynamic strength, rigidity, bearing capacity and reliability indexes of the optimized component, judging whether design requirements are met or not, and repeating the step S4 and step S5 if NO to re-optimize the laser peening strengthening region and the cross-sectional size until the design meets the requirements, or completing the design of the component if YES.

Specifically, the step S6 includes:

Step S61: estimating the performance of the component;

Step S62: judging whether the performance of the component meets the standard or not, and repeating the step S4 and step S5 if NO, or completing the design of the component if YES.

Further, the laser peening strengthening treatment modes include outer-skin full treatment, equispaced region treatment and nonequispaced region treatment for the aluminum alloy single-skin grating integral panel.

On the basis of the above-mentioned implementation modes, Step S5 specifically includes:

setting the target function and the constraint condition, wherein with the goal of minimum mass, the constraint condition is that variables of the structural strength and the rigidity are less than 0.01%, and the cross-sectional size of the component is optimized by adopting parallel computing and numerical simulation methods.

Specifically, the method for rigidity enhancement and weight reduction using laser peening provided by the present embodiment includes three parts: structural design, process design and optimum design, and builds information communication between design and manufacturing. The structural design successively includes: geometric modeling of the component, determination of the external load and the boundary condition, and structural stress and strain analysis. The process design includes: performing the laser peening strengthening test on the component, and acquiring the material performance improvement data. The optimum design includes: performing topological optimization on the strengthening region and size optimization on the cross-sectional size. After the above-mentioned two optimizations are completed, whether the performance of the component meets the standard or not is judged. The design is completed if YES. The above-mentioned two optimizations are continued if NO until the performance of the component meets the standard, and then the design is completed to obtain optimal strengthening parameters.

On the basis of the above-mentioned implementation modes, in the process design, the strengthened material performance improvement data after acquired may be applied to the structural stress and strain analysis, to quantitatively judge an improvement effect on the performance of the component by the laser peening strengthening, thereby realizing correlation between the process design and the structural design.

In order to realize the high-performance and lightweight design of aerospace and aviation components, the method for rigidity enhancement and weight reduction using laser peening further reduces the weight of the component on the basis of the existing lightweight design, thereby improving the performance of the spacecraft and the aircraft. The present disclosure improves the strength and the fatigue performance of the material by using the laser peening strengthening technology, and reasonably arranges the strengthening treatment regions by virtue of the topological optimization method, so that the component has varying cross-sectional rigidity and tensile strength. Through the adoption of the size optimization method, the laser peening strengthening has two benefits of: firstly ensuring that the design performance of the component is constant, and secondly realizing the lightweight design of the component to reduce the cross-sectional size of the component, so as to finally realize further lightweight design of the component and improve the comprehensive performance of the spacecraft and the aircraft.

The above description illustrates the method for rigidity enhancement and weight reduction using laser peening provided by the present disclosure in detail. The principle and the implementation of the present disclosure are described herein with reference to specific examples. Descriptions of the above embodiments are only used for assisting in understanding the method and a core idea of the present disclosure. It should be noted that those of ordinary skill in the art can further make several improvements and modifications to the present disclosure without departing from the principle of the present disclosure. These improvements and modifications shall also fall within the protection scope of claims of the present disclosure.

We claim:

1. A method for rigidity enhancement and weight reduction using laser peening, comprising the following steps:
    step S1: performing structural design on a component, and determining a limit size of the component;
    step S2: intercepting the component by adopting a material having the same trade mark and in an as-heat-treated state, performing laser peening strengthening test on the component, and setting multiple groups of strengthening parameters;
    step S3: performing material performance test on the component, and acquiring material performance improvement data;
    step S4: determining a topological optimization strengthening region, building a mathematical model, setting a target function and a constraint condition, and solving an area, the number and a layout form of a laser peening strengthening region by adopting a finite element;
    step S5: optimizing a cross-sectional size of the component according to the material performance improvement data; and
    step S6: estimating static/dynamic strength, rigidity, bearing capacity and reliability indexes of the optimized component, judging whether design requirements are met or not, and repeating the step S4 if NO, or completing the design of the component if YES.

2. The method for rigidity enhancement and weight reduction using laser peening according to claim 1, wherein the step S1 comprises:
    step S11: building a model of the component, and acquiring a geometric shape of the component;
    step S12: determining an external load and a boundary condition of the component; and
    step S13: performing structural stress and strain analysis according to the geometric shape, the external load and the boundary condition of the component, and determining the limit size of the component according to an analysis result.

3. The method for rigidity enhancement and weight reduction using laser peening according to claim 2, wherein the step S11 specifically comprises: building an aluminum alloy single-skin grating integral panel model by adopting CATIA software.

4. The method for rigidity enhancement and weight reduction using laser peening according to claim 3, wherein the step S13 specifically comprises: determining limit sizes of all portions of the component through theoretical analysis and numerical simulation, and performing structural instability analysis to determine a limit depth-to-width ratio of a grating structure.

5. The method for rigidity enhancement and weight reduction using laser peening according to claim 1, wherein in the step S3, the material performance improvement data comprise tensile strength, a Young modulus and fatigue life prolonging data of the material.

6. The method for rigidity enhancement and weight reduction using laser peening according to claim 1, wherein the step S4 further comprises: designing laser peening strengthening treatment modes with different forms, and acquiring structural stress characteristics under different forms.

7. The method for rigidity enhancement and weight reduction using laser peening according to claim 6, wherein the laser peening strengthening treatment modes comprise outer-skin full treatment, equispaced region treatment and nonequispaced region treatment for an aluminum alloy single-skin grating integral panel.

8. The method for rigidity enhancement and weight reduction using laser peening according to claim 1, wherein the step S5 specifically comprises:
    setting the target function and the constraint condition, wherein with the goal of minimum mass, the constraint condition is that variables of the structural strength and the rigidity are less than 0.01%, and the cross-sectional size of the component is optimized by adopting parallel computing and numerical simulation methods.

* * * * *